US011753554B2

(12) United States Patent
Burshtain et al.

(10) Patent No.: US 11,753,554 B2
(45) Date of Patent: Sep. 12, 2023

(54) DE-FLOCCULANT AS SLURRY AND EPD BATH STABILIZER AND USES THEREOF

(71) Applicant: 3DBATTERIES LTD., Rehovot (IL)

(72) Inventors: Doron Burshtain, Herzliya (IL); Erez Schreiber, Rishon le Zion (IL)

(73) Assignee: 3DBATTERIES LTD., Rehovot (IL)

( * ) Notice: Subject to any disclaimer, the term of this patent is extended or adjusted under 35 U.S.C. 154(b) by 0 days.

(21) Appl. No.: 17/257,183

(22) PCT Filed: Jul. 3, 2019

(86) PCT No.: PCT/IL2019/050737
§ 371 (c)(1),
(2) Date: Dec. 30, 2020

(87) PCT Pub. No.: WO2020/008460
PCT Pub. Date: Jan. 9, 2020

(65) Prior Publication Data
US 2021/0122930 A1     Apr. 29, 2021

Related U.S. Application Data

(60) Provisional application No. 62/693,462, filed on Jul. 3, 2018.

(51) Int. Cl.
| | |
|---|---|
| C09D 5/44 | (2006.01) |
| C09D 7/61 | (2018.01) |
| C01B 25/30 | (2006.01) |
| C25D 13/02 | (2006.01) |
| C25D 13/12 | (2006.01) |
| H01G 11/86 | (2013.01) |
| H01M 4/04 | (2006.01) |
| B82Y 30/00 | (2011.01) |
| B82Y 40/00 | (2011.01) |

(52) U.S. Cl.
CPC .............. *C09D 5/448* (2013.01); *C01B 25/30* (2013.01); *C09D 5/4407* (2013.01); *C09D 7/61* (2018.01); *C25D 13/02* (2013.01); *C25D 13/12* (2013.01); *H01G 11/86* (2013.01); *H01M 4/0457* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 2009/0061313 A1* | 3/2009 | Tadano | H01M 50/572 429/246 |
| 2014/0093769 A1* | 4/2014 | Busnaina | H01M 4/366 29/623.1 |
| 2017/0288211 A1 | 10/2017 | Zhamu et al. | |
| 2019/0190019 A1 | 6/2019 | Lee et al. | |

FOREIGN PATENT DOCUMENTS

| | | |
|---|---|---|
| JP | 2009-516359 A | 4/2009 |
| JP | 2015-118911 A | 6/2015 |
| JP | 2016-507865 A | 3/2016 |
| KR | 10-2015-0072319 A | 6/2015 |
| WO | 2007/061928 A2 | 5/2007 |
| WO | 2014/102520 A1 | 7/2014 |
| WO | 2018/038501 A1 | 3/2018 |

OTHER PUBLICATIONS

Kochkodan, et al., "Surface modification of activated carbon by surfactant mixtures", IOP Conf. Series: Materials Science and Engineering 600, 012017, 2019. (Year: 2019).*
Besra et al., "A review on fundamentals and applications of electrophoretic deposition (EPD)", Progress in Materials Science, 2007, vol. 52, pp. 1-61.
Clapperton, "The Application of Surfactant Deflocculants to Superconcentrated Household and Industrial Laundry Liquids", Journal of Surfactants and Detergents, 1998, vol. 1, No. 3, pp. 353-360.
Ferrari et al., "EPD kinetics: A review", Journal of the European Ceramic Society, 2010, vol. 30, pp. 1069-1078.
Moreno et al., "Effect of the slurry properties on the homogeneity of alumina deposits obtained by aqueous electrophoretic deposition", Materials Research Bulletin, 2000, vol. 35, pp. 887-897.
Moreno et al., "Nanoparticles Dispersion and the Effect of Related Parameters in the EPD Kinetics, Chapter 2", Nanostructure Science and Technology, Electrophoretic Deposition of Nanomaterials, 2012.
Wilhelm et al., "Significant electrochemical performance improvement of TiSnSb as anode material for Li-ion batteries with composite electrode formulation and the use of VC and FEC electrolyte additives", Electrochemistry Communications, 2012, vol. 24, pp. 89-92.

* cited by examiner

*Primary Examiner* — Christopher M Rodd
(74) *Attorney, Agent, or Firm* — Vorys, Sater, Seymour and Pease LLP; Anthony P. Venturino

(57) ABSTRACT

The technology concerns methods for stabilizing slurries and/or electrophoretic deposition (EPD) bath suspensions for the preparation of electrodes and/or separation area or any other coating and specifically, to electrodes and separators for use in energy storage devices.

15 Claims, No Drawings

DE-FLOCCULANT AS SLURRY AND EPD BATH STABILIZER AND USES THEREOF

TECHNOLOGICAL FIELD

The present invention generally concerns a method for stabilizing slurries and/or electrophoretic deposition (EPD) bath suspensions for the preparation of electrodes and/or separation area or any other coating and specifically, to electrodes and separators for use in energy storage devices.

BACKGROUND

Energy storage systems can be utilized in a wide range of electronic applications, including computers, mobile devices, personal digital assistants, power tools, navigational and communications equipment, power storage and automotive management systems. The architecture of such systems is generally constructed of a cell composed of layers comprising an anode layer, a cathode layer and a membrane (electrolyte, separator) layer disposed therebetween. For example, a cylinder type cell or more advanced systems may utilize a "Jelly roll" or "Swiss roll" configuration, in which the cell can be rolled up and/or folded inside a pouch or enclosure to provide a protective packaging of the energy storage device to eliminate exposure of the layers to external environment, including, air, oxygen, carbon monoxide, carbon dioxide, nitrogen, moisture and organic solvents. However, a large footprint (i.e. large volume per area) is typically required to achieve large capacity.

Evolution in energy storage devices due to the introduction of new product categories, for example, wearable electronics and Internet of Things (IoT), including, smart bandages, wearables, cosmetic products, smart watches, portable electronics, wireless sensors, medical disposables and microelectromechanical systems (MEMS), increasingly requires improving attributes such as thinness, flexibility, light weight and low charging thresholds. Standard design limitations of energy storage devices dictate large footprints for products requiring large capacity, for example, due to the packaging layer that substantially increases weight and volume of the energy storage device, and consequently, reduces its energy density.

Other challenges involved in energy storage devices relate to properties of the layers of the cell. For example, the anode layer, which typically expands and contracts during the operation of the device, may eventually lead to mechanical and/or chemical failure and reduce the lifetime and/or degrade performance of the energy storage device. Additional problems arise from the electrodes preparation methods which includes preparation of slurry paste which should homogeneously include all the electrode ingredients, e.g. active materials, conductive additives, binder etc. In most cases, the slurry suspension medium is based on water or an organic solvent such as N-methyl pyrrolidone (NMP).

One of the most important factors enabling reproducible performance and results is the stability of the slurry suspension. An unstable slurry is prone to phase separation of the ingredients, and consequently the resultant electrodes produced from the slurry are inhomogeneous, displaying unacceptable electrochemical behavior. In addition, the casting, deposition or spreading mechanism and accuracy strongly depend on the stability of the slurry suspension. A narrow viscosity working window (measured by a viscometer in most cases) exists to ensure repeatability of the electrode spreading, and hence, while the suspension can hold up to several hours, in most cases is being used shortly after preparation.

When it comes to electrophoretic deposition (EPD) baths, in most cases a low viscosity suspension which contains all ingredients is used. Such a suspension, which contains particles in various sizes, ranging from nano to micrometer, is even less stable than the slurry discussed hereinabove. Moreover, during the deposition process, the concentrations of the components in the bath change, and hence the delicate balance between charges and steric interactions, which keeps the suspension stable, can quickly shift the stability, causing particles to coagulate, flocculate, agglomerate and sediment, resulting in the formation of inhomogeneous deposition which does not function as designed.

It should be noted that while in regular spreading techniques the slurry contains all ingredients homogeneously dispersed, which results in homogeneously dispersed ingredients in the dried electrode, in EPD each ingredient (e.g. active material, conductive additive, binder) has its own particle size distribution and surface charge, and hence non-homogeneous deposition is likely to occur.

In different deposition methods, such as simple spreading using the slurry as described above or utilizing an EPD bath, the problem appears to be more serious where the particles are larger than 10 micrometers, or smaller than 1 micrometer. It is known that in the case of particles larger than 10 microns, the particles tend to settle with the smaller particles, while in the sub-micron range, large flocs are almost instantly formed and hence result in a network of inhomogeneous areas. Therefore, both slurry spreading techniques, and EPD bath methods suffer from such tendency of particles settling and/or agglomerating in the slurry mixture and during the deposition process.

Approaches towards solving the aforementioned problems include the addition of surfactants into the slurry. Several surfactants have been utilized in order to stabilize the EPD baths for longer periods. For example, Wilhelm et al [1] describe the mixing of carbon black or graphite conductive additives with Triton X100 prior to introducing said mixture into a water-based or organic based slurry. Other surfactants were also used, some causing serious foaming and electrochemical interferences during cycling, for example, in lithium ion batteries or capacitors. While some improvements are seen in the slurry's stability, the handling is not straight-forward, and the stability of the slurry's viscosity is increased over just a few hours, which is still a limiting factor in the battery electrodes preparation process.

Phosphate, oxalates and other dispersants were previously used as stabilizers of water-based suspensions in [2] for measuring particle size distribution of soils. All substances used to stabilize water-based suspensions, and the deflocculants and dispersants used were soluble in aqueous environments. However, these substances are used for stabilizing relatively low particle size distribution in diluted water-based suspensions.

Richard M. Clapperton [3] demonstrates use of surfactant deflocculants in contrast to surfactant flocculants in improving suspension mechanism in household and industrial laundry liquids. While all deflocculants were demonstrated to be surfactants, not all surfactants demonstrated deflocculating capabilities.

BACKGROUND ART

[1] H. A. Wilhelm et al *Electrochem. Comm.* 2012 (24), 89-92

[2] A. M. Wintermyer et al *Highway Research Board Bulletin*, 1955 (55), 2-14

[3] R. M. Clapperton *Journal of Surfactants and Detergents*, 1998 (1) 353-360.

GENERAL DESCRIPTION

It is a purpose of the invention to provide efficient additives and methods for stabilizing slurry mixtures and electrophoresis (EPD) bath suspensions to allow consistent and homogenous compositions useful for the deposition of functional electrode materials.

In most general terms, the present invention contemplates energy storage devices and systems, and more specifically, components for energy storage devices and systems, including electrodes, electrolytes and packaging materials, and methods to their stabilization during preparation process and storage.

In accordance with the invention disclosed herein, slurry mixtures and EPD bath suspensions are treated with a deflocculating agent that not also prevents the formation of aggregates and flocs of any particulate material that exists in the slurry or suspension, but also reduces the aggregate population that is already present. The deflocculant material used in accordance with the present invention is not merely a surfactant material but rather selected to meet the characteristics and prerequisites defined herein.

Mechanisms of flocculation and agglomeration are well established in the art. Agglomeration refers to formation of firmly bound particles which is brought about by collision between these particles, or between the particles and agglomerates that are formed, or between pre-existing agglomerates or agglomerates of various sizes that form in the process. The agglomeration consists of a destabilization and a transport process. Destabilization may be in a form of coagulation or in the form of flocculation. In general, both mechanisms occur in parallel.

Before a suspension is at all able to form flocks or agglomerates, it must be destabilized. In this context stable refers to a suspension that if at all only slightly tends to self-flocculate and thus settles very slowly. Unstable refers to a suspension that forms flocks very quickly and thus the solids settle very fast. In the so-called coagulation the self-flocculation of the solids is caused by inter-particle interactions. Electrostatic repulsion, van der Waals attraction and possibly electric or magnetic forces act between the particles. Depending on which force prevails flocks are formed or not.

The physical background of the forces are discussed intensely in literature frequently under the section DLVO theory. These intermolecular forces can be manipulated to achieve the particular desired effect of destabilization by the addition of salts and/or by changing the pH of the suspension. The destabilization is most usually observed at a zeta potential, z=0, which is also known as the isoelectric point. The zeta potential is a measure of the surface charge of particles and is largely responsible for the electrostatic repulsion forces.

Flocculation refers to the accumulation of high molecular weight flocculants on the surface of particles. The destabilization is achieved by reactive cationic or anionic groups and can be controlled by the pH of the suspension. Flocculants are roughly divided into natural organic flocculants or synthetic polymeric flocculants. The attachment of particles to the polymer molecules takes place by hydrogen bonds, electrostatic interactions, ion bonding and gel formation. Flocculation involves two mechanisms. First, the charge mechanism for short-chain polymers, which attach themselves only to a particle and move its surface charge such that there is interaction with other particles. The other is the bond model in which multiple solid particles are grouped together by a polymer network of long-chain polymeric flocculants to agglomerate. Flocculation is thus a process in which colloids come-out of suspension in the form of floc or flakes, either spontaneously or due to the addition of a clarifying agent. The action differs from precipitation in that prior to flocculation, colloids are merely suspended in a liquid and not actually dissolved in a solution. In the flocculated system, there is no formation of a cake, since all the flocs are in the suspension. Both coagulation and flocculation can be enhanced by the presence of polymers and/or other substances in the suspension.

It is thus an aim of the invention to provide a stable (or stabilized) suspension comprising at least one active material in a particulate solid form, at least one conducting additive in a particulate solid form, at least one deflocculant and optionally at least one binder.

In some embodiments, where the electrodes and/or separator are for solid state energy storage devices, the binder is not present in a suspension.

In some embodiment, the suspension is in the form of a slurry, e.g., being of a higher viscosity or higher specific gravity in view of smaller amounts of a solvent or a liquid carrier or in view of a relatively higher solid content. In cases where the suspension includes larger volumes of at least one solvent or a liquid carrier or a lower solid content, the slurry may be in the form of a diluted form.

As used herein, a "slurry" is a suspension of the invention having a specific gravity that is >1.

As a person versed in the art would recognize, in battery electrode systems, a binder is used to hold the electrode structure together. In other words, the binder is used as an adhesive to associate the electrode to the current collector. The binder, however, is also used to hold the particles together (cohesion), keeping the particles and agglomerates apart from each other. During the preparation process, the binder partly coats the particles and the agglomerates, and hence while drying, the binder serves as an intermediate porous medium between the particles. The deflocculant is used, during the construction of the electrode, to distance the particles in the agglomeration, and limit further agglomeration during the process, and hence the electrode received has a more homogeneous particle size distribution.

Suspensions of the invention include a variety of materials in solid particulate forms. Spreading techniques and electrodeposition methods, such as EPD, which utilize suspensions of solid materials suffer from an inherent tendency of the particles to settle or aggregate, eventually leading to separation of phases. The addition of at least one deflocculant in accordance with the invention prevents or substantially minimizes settling or aggregation of the particulate materials and thus prevents formation of clusters and phase separation. The addition of the at least one deflocculant also affords highly stable suspensions wherein the suspension components are homogeneously distributed in the medium, thereby providing consistent films by EPD and by casting/spreading methods.

As used herein, the term "stabilized suspension", or any lingual variation thereof, refers to a liquid suspension which comprises a plurality of insoluble solid particles, which in the absence of the at least one deflocculant, will lose homogeneity as reflected by settling and/or aggregation of the solid particles. A stabilized suspension is thus a suspension according to the invention which comprises a plurality of solid particulates materials which do not settle or aggregate over a period of time, ranging from several hours to several days and more.

Stable suspensions of the invention are liquid suspensions comprising a carrier liquid. The amount of the carrier liquid may vary depending on the viscosity that is required. Where a high viscosity suspension is desired, a slurry may be formed. Suspensions of lower viscosities may also be desired for certain applications and thus are also within the scope of the present invention.

The carrier liquid may be a single liquid carrier or a mixture of two or more liquids. The liquid carrier may be selected from water, organic solvents and mixtures thereof. In some embodiments, the carrier liquid is selected from NMP, acetone, isopropanol, dimethyl acetamide, dimethylformamide, dichloroethane, methanol, ethanol, acetylacetone and mixtures thereof.

The at least one deflocculant is selected amongst materials that increase zeta potential of the suspension and therefore bring an increase in the repulsive forces between the solid particles. In some embodiments, the at least one deflocculant is selected amongst such materials that are further inert to the presence of lithium ions, namely do not undergo interaction with lithium ions. The at least one deflocculant is further selected amongst such materials having relatively small effective radii.

In some embodiments, the at least one deflocculant is selected from surfactants that are capable of preventing agglomeration of nano- or microparticles, as defined. As not all surfactants have the ability to prevent or limit such particle flocculation, it may not be immediately evident which surfactant can be used as a deflocculant according to the invention.

In some embodiments, the at least one deflocculant is selected from organic and inorganic deflocculating materials.

The at least one organic deflocculant may be selected from humic acids and derivatives thereof, alkaline lignosulfonates, tannin compounds, polymeric materials such as polyacrylates and polycarbonates, and others.

The at least one inorganic deflocculant may be selected from metal carbonates, metal hydroxides, metal silicates, metal phosphates, metal polyphosphates, metal oxalates and others. In some embodiments, the metal is selected from sodium, potassium, lithium, magnesium, manganese, aluminum and strontium.

In some embodiments, the at least one inorganic deflocculant may be selected from ammonium carbonates, ammonium hydroxides, ammonium silicates, ammonium phosphates, ammonium polyphosphates, ammonium oxalates and others. In some embodiments, each of the at least one inorganic deflocculants, e.g., any of the aforementioned ammonium or metal forms, is inert to the presence of lithium ions, namely does not undergo interaction with lithium ions present in the suspension.

In some embodiments, the at least one inorganic deflocculant is an alkaline polyphosphate, e.g., in the form of a sodium or an ammonium salt.

In some embodiments, the at least one inorganic deflocculant is a phosphate. In some embodiments, the phosphate is selected from sodium salts of a phosphate salt. In some embodiments, the at least one deflocculant is selected from sodium hexametaphosphate (SHMP $(NaPO_3)_n$), SHMP derivatives (R-SHMP), trisodium phosphate, tetrasodium pyrophosphate, sodium tripolyphosphate, sodium tetraphosphate, and sodium polyphosphates.

As experimental data below demonstrates, use of a phosphate as the at least one deflocculant, in a system comprising silicon nanoparticles, as the (anode) least one active material in a particulate solid form and at least one conducting additive in a particulate solid form, is superior to other exiting deflocculant agents.

In one particular experiment, three suspensions were formed: the first containing only silicon nanoparticles in a medium, the second containing a phosphate such as SHMP and silicon nanoparticles, and the third containing the extensively used KH550 (a surfactant) and silicon nanoparticles, in a medium identical to all three suspension. As the data demonstrates, nanoparticle flocculation occurred in the first suspension and the third suspension. Almost no agglomeration was observed where SHMP was used at the same time scale.

As stated herein, the at least one deflocculant is needed in suspensions comprising at least one active material in a particulate solid form, at least one conducting additive in a particulate solid form and at least one binder.

The at least one active material is typically a material used for the manufacture of a functional electrode (an anode or a cathode). The active material may be used to form a composite lithium anode, a composite cathode or a separation area suitable for a lithium ion devise. As such, the active material may vary based on the intended use.

Anode active materials may be selected from graphite, silicon-based materials, carbon-silicon composite materials, metal-based materials, metal composite materials, carbon-metal composite materials and combination thereof.

In some embodiments, the silicon-based materials are selected from silicon nanoparticles (SiNP), silicon nanowires (SiNW) and silicon nano flakes (SiNF).

In some embodiments, the carbon-silicon composite materials are selected from silicon on reduced graphene oxide (silicon@rGO), silicon@graphite, silicon@hard-carbon, silicon@carbon and others. As used herein, 'hard carbon' materials are graphite-free materials (or graphite free structures).

In some embodiments, the metal-based materials are selected from lithium, lithium titanium oxide (LTO), germanium nanoparticles (GeNP), germanium nanowires (GeNW), tin nanoparticles (SnNP), tin nanowires (SnNW), tin/tin sulfide, lead nanoparticles (PbNP), lead nanowires (PbNW), lithium metal alloy (Such as $Li_xSi_n$), aluminum, core/shell metal particles such as core/shell aluminum particles (wherein e.g., the core material is or comprises aluminum and the shell material is or comprises a material such as $TiO_2$.

In some embodiments, the carbon-metal composite material is selected from tin/tin sulfide on reduced graphene oxide (Sn/SnS@rGO), tin@rGO, lead@rGO, tin@ graphite, tin@hard-carbon, tin@carbon, lead@graphite, lead@hard-carbon, lead@carbon and combination thereof.

Cathode active materials may be selected from lithium nickel manganese cobalt oxide (NMC), lithium iron phosphate (LFP), lithium cobalt oxide (LCO), lithium ferrophosphate (LFP), lithium manganese iron phosphate (LMFP), lithium nickel cobalt aluminum oxide (NCA), lithium manganese oxide (LMO), lithium nickel manganese oxide (LNMO), nickel-rich cathode (lithium nickel oxide, LNO) and combination thereof.

The at least one active material is provided in a form of solid particles (nanoparticles or microparticles), having a diameter ranging from about 5 nm to about 20 micrometer. In some embodiments, the particles having an averaged diameter of between 5 nm and 1,000 nm, between 5 nm and 900 nm, between 5 nm and 800 nm, between 5 nm and 700 nm, between 5 nm and 600 nm, between 5 nm and 500 nm, between 5 nm and 400 nm, between 5 nm and 300 nm, between 5 nm and 200 nm, between 5 nm and 100 nm, between 5 nm and 90 nm, between 5 nm and 80 nm, between 5 nm and 70 nm, between 5 nm and 60 nm, between 5 nm and 50 nm, between 5 nm and 10 nm, between 100 nm and 1,000 nm, between 200 nm and 1,000 nm, between 300 nm and 1,000 nm, between 400 nm and 1,000 nm, between 500 nm and 1,000 nm, between 600 nm and 1,000 nm, between 700 nm and 1,000 nm, between 800 nm and 1,000 nm, between 900 nm and 1,000 nm, between 1 micron and 20 micron, between 2 micron and 20 micron, between 3 micron and 20 micron, between 4 micron and 20 micron, between 5 micron and 20 micron, between 6 micron and 20 micron, between 7 micron and 20 micron, between 8 micron and 20 micron, between 9 micron and 20 micron, between 10 micron and 20 micron, between 11 micron and 20 micron, between 12 micron and 20 micron, between 13 micron and 20 micron, between 14 micron and 20 micron, between 15 micron and 20 micron, between 16 micron and 20 micron, between 17 micron and 20 micron, between 18 micron and 20 micron or between 19 micron and 20 micron.

In some embodiments, the particle sizes are selected based on the amount and/or type of the deflocculant used.

In some embodiments, the particles have an averaged diameter of between 10 nm and 100 nm, between 10 nm and 90 nm, between 10 nm and 80 nm, between 10 nm and 70 nm, between 10 nm and 60 nm, between 10 nm and 50 nm, between 10 nm and 40 nm, between 10 nm and 30 nm, between 20 nm and 100 nm, between 20 nm and 90 nm, between 20 nm and 80 nm, between 20 nm and 70 nm, between 20 nm and 60 nm or between 20 nm and 50 nm.

In some embodiment, the at least one active material is a silicon-based material in the form of particles having averaged diameter of between 20 and 80 nm.

The at least one conductive additive is at least one conductive material in the form of solid particles. The conductive additive may be selected from carbon based materials or carbon composite materials. Non-limiting examples include carbon black (such as Super C45, Super C65), single-walled carbon nanotubes (SWCNTs), multi-walled carbon nanotubes (MWCNTs), graphite, tungsten carbide (WC) and combinations thereof.

The conductive additive presented as solid particles may be of a diameter ranging from 10 nm to 10 microns. In some embodiments, the particles having an averaged diameter between 10 nm and 1,000 nm, between 10 nm and 900 nm, between 10 nm and 800 nm, between 10 nm and 700 nm, between 10 nm and 600 nm, between 10 nm and 500 nm, between 10 nm and 400 nm, between 10 nm and 300 nm, between 10 nm and 200 nm, between 10 nm and 100 nm, between 10 nm and 90 nm, between 10 nm and 80 nm, between 10 nm and 70 nm, between 10 nm and 60 nm, between 10 nm and 50 nm, between 100 nm and 1,000 nm, between 200 nm and 1,000 nm, between 300 nm and 1,000 nm, between 400 nm and 1,000 nm, between 500 nm and 1,000 nm, between 600 nm and 1,000 nm, between 700 nm and 1,000 nm, between 800 nm and 1,000 nm, between 900 nm and 1,000 nm, between 1 micron and 10 micron, between 2 micron and 10 micron, between 3 micron and 10 micron, between 4 micron and 10 micron, between 5 micron and 10 micron, between 6 micron and 10 micron, between 7 micron and 10 micron, between 8 micron and 10 micron or between 9 micron and 10 micron.

In some embodiments, a stable suspension according to the invention comprises a plurality of the at least one active material in a particulate solid form and a plurality of the at least one conducting additive, being also in a particulate solid form. In such embodiments, the particle populations are separately introduced and independently present in the suspension. In other embodiments, however, the at least one active material and the at least one conducting additive may be added in a mixed form, wherein the solid particles comprise a predefined mixture (at a defined ratio and composition) of the two materials.

At least one binder is added to a suspension of the invention in order to associate the structure of the electrode to the current collector, and to hold the particles together (cohesion), keeping the particles and agglomerates apart from each other. During the preparation process, the binder partly coats the particles and the agglomerates, and hence while drying it serves as an intermediate porous medium between the particles. The at least one binder may be presented in a solid, solvated or liquid form (at a temperature between 23 and 30° C., RT).

In some embodiments, the at least one binder is selected from carboxymethyl cellulose (CMC) and derivatives thereof (e.g., lithium CMC or sodium CMC), styrene-butadiene rubber (SBR), polyvinyliedene fluoride (PVDF), lithium alginate, sodium Alginate, sodium polyacrylic acid (PAA), lithium PAA, ionic conducting polymers (such as polyethylene oxide (PEO), cross linked PEO, lithium polyphosphate, sodium polyphosphate, potassium polyphosphate), hydrophobic or super-hydrophobic ion conductive polymers (such as poly[bis(2-(2-methoxyethoxy)ethoxy)phosphazene] (MEEP), polynorbornene polymers with 2-(2-methoxyethoxy)ethoxy and/or hydrophobic 2,2,2-trifluoroethoxy side groups, polymers substituted with 2-(2-methoxyethoxy)ethoxy and/or hydrophobic 2,2,2-trifluoroethoxy side groups), optionally in crosslinked forms, and combination thereof.

In some embodiments, any of the above binders may be associated or crosslinked (in case of polymeric materials) to any other material. In some embodiments, the polymeric binders disclosed herein may be crosslinked or associated with EDTA.

In some embodiments, the at least one binder is an ion conducting polymer. In some embodiments, the ion conducting polymer is selected from polyethylene oxide (PEO), propylammonium phosphate, lithium polyacrylic acid (LiPA) and poly acrylic acid (PAA).

According to the principles of the present invention, considering the particles' size distribution in a suspension sought to be stabilized and the organic or aqueous medium in which the particles are to be dispersed, in some embodiments, an amount of at least one dispersant may be added. The amount of the dispersant may be no greater than 10% w/w (up to 10% w/w). Non-limiting examples of such dispersant materials include styrene butadiene (SBR), 3-aminopropyltriethoxysilane (KH550), polyethyleneoxide (PEO), PVDF, LiPA, PAA, and others. The dispersant may, but not necessarily, also function as a binder. In such cases, the dispersant may contribute to the electric conductivity, along with ionic conductivity, conductive additives such as carbon black, CNTs etc.

Suspensions of the invention may be used in a variety of fabrication methods and as bath media in electrophoretic deposition methods.

As known in the art, electrophoretic deposition (EPD) is an electrochemical method which is carried out in a two-electrode cell. When direct current is applied, charged particles suspended in liquid medium move toward the oppositely charged electrode and accumulate at the deposition electrode to create a relatively compact and homogeneous film. Therefore, EPD can be applied to any solid that is available as a fine powder and may be used to achieve cathodic electrodeposition, anodic electrodeposition and electrophoretic coating of a separation. To achieve a compact and homogenous deposition, the EPD bath, in which the deposition process rakes place, must contain a stable suspension of the active materials, as defined herein.

Thus, in some embodiments, the suspension is used in an EPD method for fabricating an electrode, i.e., an anode electrode or a cathode electrode. In such a use, a suspension of the invention is the bath (herein EPD bath) medium in which the deposition process takes place.

In some embodiments, for EPD, the components of the suspension many be mixed with a liquid carrier in an amount to provide an EPD suspension of a high viscosity, i.e., a slurry. In some embodiments, the slurry may be diluted with a solvent or a liquid carrier, as disclosed herein, to provide a suspension, as disclosed.

In some embodiment, the suspension is used in an EPD method for fabricating an anode electrode. In some embodiments for fabricating anode electrodes, the at least one active material may be selected from graphite, silicon nanoparticles (SiNP), silicon nanowires (SiNW), lithium titanium oxide (LTO), germanium nanoparticles (GeNP), germanium nanowires (GeNW), tin nanoparticles (SnNP), tin nanowires (SnNW), tin/tin sulfide, tin/tin sulfide on reduced graphene oxide (Sn/SnS@rGO), silicon@rGO, tin@rGO, lead nanoparticles (PbNP), lead nanowires (PbNW), lead@rGO, lithium metal alloy (Such as $Li_xSi_n$), lithium and combination thereof.

In some embodiments, for fabricating anode electrodes, in an EPD suspension the at least one active material constitutes between about 40 wt % to about 99.95 wt % of the EPD bath composition. In an EPD slurry, the amount may be between about 40 wt % to about 99.95 wt % of the slurry composition.

In some embodiments, for fabricating anode electrodes, in an EPD suspension the at least one conductive additive constitutes between about 0.05 wt % to about 25 wt % of the EPD bath composition. In an EPD slurry, the amount may be between about 0.05 wt % to about 25 wt % of the slurry composition.

In some embodiments for fabricating anode electrodes, in an EPD suspension the binder constitutes between about 0 wt % to about 25 wt % of the EPD bath composition. In an EPD slurry, the amount may be between about 0 wt % to about 25 wt % of the slurry composition (e.g., if the at least one active material, the at least one conductive additive and the binder (partly or fully) are introduced to the EPD bath from a previously made slurry).

In some embodiment, the suspension is used in an EPD method for fabricating a cathode electrode. In some embodiments for fabricating cathode electrodes, the at least one active material utilized in the EDP bath is selected from lithium nickel cobalt manganese oxide (NMC), lithium iron phosphate (LFP), lithium manganese iron phosphate (LMFP), lithium nickel cobalt aluminum oxide (NCA), lithium manganese oxide (LMO), lithium nickel manganese spinel (LNMO), lithium cobalt oxide (LCO) and combination thereof.

In some embodiments, for fabricating cathode electrodes, in an EPD suspension, the at least one active material constitutes between about 60 wt % to about 99.95 wt % of the EPD bath composition. In an EPD slurry, the amount may be between about 60 wt % to about 99.95 wt % of the slurry composition.

In some embodiments, for fabricating cathode electrodes, in an EPD suspension the at least one conductive additive constitutes between about 0.05 wt % to about 25 wt % of the EPD bath composition. In an EPD slurry, the amount may be between about 0.05 wt % to about 25 wt % of the slurry composition.

In some embodiments, for fabricating cathode electrodes, in an EPD suspension the binder constitutes between about 0 wt % to about 25 wt % of the EPD bath composition. In an EPD slurry, the amount may be between about 0 wt % to about 25 wt % of the slurry composition.

In some embodiment, the suspension is used in an EPD method for fabricating a separation area. In some embodiments, for fabricating a separation area, the at least one active material (e.g., the ion conductive polymer) is selected from polyvinyliedene fluoride (PVDF), polyethylene oxide (PEO), polyethylene (PE), polypropylene (PP), carboxymethyl cellulose (CMC), polyacrylic acid (PAA), lithium polyacrylic acid (LiPA), cellulose and combinations thereof.

In some embodiments, for fabricating a separation area, in an EPD suspension the binder constitutes between about 2 wt % to about 100 wt % of the EPD bath composition. In an EPD slurry, the amount may be between about 2 wt % to about 100 wt % of the slurry composition.

In some embodiments for fabricating a separation area, the suspension may comprise at least one additive. Such additives may be selected from ceramic particles such as TiOx microparticles, TiOx nano particles, $Al_2O_3$ microparticles, $Al_2O_3$, Lithium metasilicate ($Li_2SiO_3$) nanoparticles and/or microparticles, and/or submicro-particles, or other particles such as lithium fluoride (LiF) and combinations thereof. The at least one additive may constitute between about 1 wt % to about 98 wt % of the EPD bath composition. In an EPD slurry, the amount may be between about 1 wt % to about 98 wt % of the slurry composition.

In some embodiments, the weight percentage of the at least one active material, at least one conductive additive and the binder combined is between about 40% to about 100%. In some embodiments, the weight percentage is between about 0.05% to about 25% or between about 0% to about 40%, or between 80% to about 100%.

The invention further provides use of at least one deflocculant for stabilizing a suspension containing a plurality of nano- and/or microparticles.

The invention further provides use of a stabilized suspension of the invention for the preparation of energy storage electrodes.

The invention further contemplates use of a stabilized suspension of the invention for the preparation of a separation area for energy storage devices.

Further provided is a use of a stabilized suspension for the preparation of energy storage devices, e.g., utilizing a spreading technique. Thus, the invention further provides an energy storage device comprising an electrode or a separation area constructed using a suspension of the invention.

In another aspect, the invention contemplates a method of electrophoretic deposition utilizing a bath suspension medium, as disclosed herein. In some embodiments, the suspension comprises at least one active material, at least one conductive additive, at least one binder and at least one deflocculant, as defined herein. In some embodiments, the suspension comprises at least one electrode active material such as lithium metal particles and/or lithium alloy such as lithium silicide, graphite, silicon, LTO for anodes, or LCO, NMC, NCA, LNMO, LFP for cathodes; at least one conductive additive such as carbon black (e.g. SC65, SC64), graphite, CNTs; at least one binder such as PVDF, CMC, LiPA, PAA, SBR, and optionally at least one charger agent. The at least one charger agent may be selected from iodine, Mg(NO$_3$)$_2$, and Cellulose nanocrystals (CNCs).

In an EPD method utilizing a suspension of the invention, in some embodiments, the solids concentration (w/w) may vary between about 0.5 to about 50 gr/100 ml. In some embodiments, the solids concentration ranges between 0.5 gr/100 ml to 10 gr/100 ml. In some embodiments, the viscosity of the bath continuous phase (namely that of the liquid medium constituting the suspension) may vary between 0.4 to 500 cP.

In some embodiments, the solids concentration (w/w) in the slurry may vary between about 5 g to about 250 gr/100 ml. In some embodiments, the solids concentration ranges between 30 gr/100 ml to about 150 gr/100 ml. In some embodiments, the viscosity of the bath continuous phase may vary between about 30 to about 1000 cP. In other embodiments, the viscosity is between about 50 to about 500 cP.

In some embodiments, the method is for manufacturing an electrode optionally characterized by an electrode thickness between about 20 to about 150 μm. In some embodiments, wherein silicon-based active materials are utilized, the electrode thickness is between 0.2 and 150 μm. In some embodiments, the electrode thickness is at least 150 micrometer.

In some embodiments, the EPD bath is based on a gel composition, having a viscosity of between about 800 to about 2500 centipoise. The medium may be any one water or organic solvent as disclosed hereinabove.

As noted hereinabove, solid particle (active material and/or conductive additive) may be nanometric or micrometric in size (diameter) and may vary between several nanometers to several tens of micrometers in diameter, and in case of nanowires from several nanometers up to 300 nm in diameter, especially between 10 nm to 100 nm in diameter. In some embodiments, the nanowires may have an average length of between several tens of nanometers to several millimeters, or between 500 nm to 10 micrometers. In some embodiments, the nanowires' length may be between 1 to 5 μm.

According to the principles of the present invention, in order to achieve a suspension for an EPD bath, the at least one deflocculating agent is added to the carrier liquid optionally before the solid particulate materials are added. In some embodiments, the at least one deflocculating agent is an electronic-rich material having a relatively small effective radius. In some embodiments, the at least one deflocculating agent is a negatively charged phosphate-based material selected from sodium hexametaphosphate (SHMP, (NaPO$_3$)$_n$), SHMP derivatives (R-SHMP), trisodium phosphate, tetrasodium pyrophosphate, sodium tripolyphosphate, sodium tetraphosphate and sodium polyphosphates.

Thus, the invention provides the following aspects and embodiments of the invention:

A stabilized suspension comprising at least one active material in a particulate solid form, at least one conducting additive in a particulate solid form, at least one liquid carrier, at least one deflocculant and optionally at least one binder.

The suspension may be in a form of slurry.

The liquid carrier may be selected from water, organic solvents and mixtures thereof.

The liquid carrier may be selected from NMP, acetone, isopropanol, dimethyl acetamide, dimethylformamide, dichloroethane, methanol, ethanol, acetylacetone and mixtures thereof.

The suspension may be an electrophoresis deposition medium, e.g., a EPD bath.

The suspension may be substantially free of agglomerated particulate materials.

The at least one deflocculant may be selected amongst materials capable of increasing a zeta potential of the suspension and increasing repulsive forces between solid particles present in the suspension.

The at least one deflocculant may be inert to presence of lithium ions in the suspension.

The at least one deflocculant may be selected from organic and inorganic deflocculating materials.

The deflocculant, e.g., the organic deflocculant, may be selected from humic acids and derivatives thereof, alkaline lignosulfonates, tannin compounds, and polymeric materials.

The deflocculant, e.g., the inorganic deflocculant, may be selected from metal carbonates, metal hydroxides, metal silicates, metal phosphates, metal polyphosphates and metal oxalates.

The metal may be selected from sodium, potassium, lithium, magnesium, manganese, aluminum and strontium.

The inorganic deflocculant may be selected from ammonium carbonates, ammonium hydroxides, ammonium silicates, ammonium phosphates, ammonium polyphosphates and ammonium oxalates.

The inorganic deflocculant may be inert to presence of lithium ions.

The inorganic deflocculant may be an alkaline polyphosphate.

The inorganic deflocculant may be a phosphate.

The phosphate may be selected from sodium salts of a phosphate salt.

The at least one deflocculant may be selected from sodium hexametaphosphate (SHMP (NaPO$_3$)$_n$), SHMP derivatives (R-SHMP), trisodium phosphate, tetrasodium pyrophosphate, sodium tripolyphosphate, sodium tetraphosphate, and sodium polyphosphates.

The suspension according to claim 18, wherein the at least one defloccculant is SHMP.

The suspension may be for use in manufacturing a functional electrode or a separation area.

The electrode may be an anode.

The at least one active material may be an anode active material selected from graphite, silicon-based materials, carbon-silicon composite materials, metal-based materials, metal composite materials, carbon-metal composite materials and combination thereof.

The silicon-based material may be selected from silicon nanoparticles (SiNP), silicon nanowires (SiNW) and silicon nano flakes (SiNF).

The carbon-silicon composite material may be selected from silicon on reduced graphene oxide (silicon @rGO), silicon@ graphite, silicon @hard-carbon and silicon @ carbon.

The metal-based material may be selected from lithium titanium oxide (LTO), germanium nanoparticles (GeNP), germanium nanowires (GeNW), tin nanoparticles (SnNP), tin nanowires (SnNW), tin/tin sulfide, lead nanoparticles (PbNP), lead nanowires (PbNW), lithium metal alloy (Such as Li$_x$Si$_n$), aluminum, core/shell aluminum particles, lithium and combination thereof.

The carbon-metal composite material may be selected from tin/tin sulfide on reduced graphene oxide (Sn/SnS@rGO), tin@rGO, lead@rGO, tin@graphite, tin@hard-carbon, tin@carbon, lead@graphite, lead@hard-carbon, lead@carbon and combination thereof.

The electrode may be a cathode.

The at least one active material may be a cathode active material selected from lithium nickel manganese cobalt oxide (NMC), lithium iron phosphate (LFP), lithium cobalt oxide (LCO), lithium ferrophosphate (LFP), lithium manganese iron phosphate (LMFP), lithium nickel cobalt aluminum oxide (NCA), lithium manganese oxide (LMO), lithium nickel manganese oxide (LNMO), nickel-rich cathode (lithium nickel oxide, LNO) and combination thereof.

The at least one active material may be provided in a form of solid particles having a diameter ranging from about 5 nm to about 20 micrometer.

The at least one active material may be a silicon-based material in a form of particles having averaged diameter of between 20 and 80 nm.

The at least one conductive additive in the form of particles may be selected from carbon based materials or carbon composite materials.

The at least one conductive additive particles may be selected from carbon black, single-walled carbon nanotubes (SWCNTs), multiwalled carbon nanotubes (MWCNTs), graphite, tungsten carbide (WC) and combinations thereof.

The conductive additive particles may have a diameter ranging from 10 nm to 10 microns.

The at least one binder may be selected from carboxymethyl cellulose (CMC) and derivatives thereof, styrene-butadiene rubber (SBR), polyvinyliedene fluoride (PVDF), lithium alginate, sodium Alginate, sodium polyacrylic acid (PAA), lithium PAA, ionic conducting polymers, hydrophobic or super-hydrophobic ion conductive polymers, optionally in crosslinked forms, and combination thereof.

The at least one binder may be an ion conducting polymer.

The ion conducting polymer may be selected from polyethylene oxide (PEO), propylammonium phosphate, lithium polyacrylic acid (LiPA) and poly acrylic acid (PAA).

The suspension may further comprise at least one dispersant.

Also provided is a use of a suspension as herein on all embodiments and aspects in a method of fabricating an electrode of an energy storage unit.

The method may be EPD.

The method may comprise a step of spreading a film of a slurry or suspension of the invention.

The suspension may be used in an EPD method for fabricating an anode electrode.

The anode active material may be selected from graphite, silicon nanoparticles (SiNP), silicon nanowires (SiNW), lithium titanium oxide (LTO), germanium nanoparticles (GeNP), germanium nanowires (GeNW), tin nanoparticles (SnNP), tin nanowires (SnNW), tin/tin sulfide, tin/tin sulfide on reduced graphene oxide (Sn/SnS@rGO), silicon@rGO, tin@rGO, lead nanoparticles (PbNP), lead nanowires (PbNW), lead@rGO, lithium metal alloy (Such as $Li_xSi_n$), lithium and combination thereof.

The suspension may be used in an EPD method for fabricating a cathode electrode.

The cathode active material may be selected from lithium nickel cobalt manganese oxide (NMC), lithium iron phosphate (LFP), lithium manganese iron phosphate (LMFP), lithium nickel cobalt aluminum oxide (NCA), lithium manganese oxide (LMO), lithium nickel manganese spinel (LNMO), lithium cobalt oxide (LCO) and combination thereof.

The suspension may be used in an EPD method for fabricating a separation area.

The may be separation area having an ion conductive polymer selected from polyvinyliedene fluoride (PVDF), polyethylene oxide (PEO), polyethylene (PE), polypropylene (PP), carboxymethyl cellulose (CMC), polyacrylic acid (PAA), lithium polyacrylic acid (LiPA), cellulose and combinations thereof.

Also provided is a method of electrophoretic deposition comprising obtaining a suspension or slurry of the invention.

The suspension may be in a form of an EPD bath.

The suspension may be prepared by adding at least one deflocculating agent to a carrier liquid, optionally prior to adding solid particulate materials.

DETAILED DESCRIPTION OF EMBODIMENTS

Example 1—Stability Test

The following samples were prepared in order to study the effect of stabilization of a phosphate-based deflocculant, e.g., SHMP, on EPD bath compositions as described herein:

Preparation of Suspension 1

0.0548 gr of iodine was added to 100 ml of acetone, and were mixed until full dissolution. Then, 1 gr of NMC 532 (D10=3.7 μm, D50=10.1 μm. D90=18.2 μm) was added to the mixture and mixed for another 15 minutes, followed by addition of 0.022 gr PVDF and was mixed for 30 minutes. Then 0.033 gr of SC 65 was added and mixed for 1 hour, followed by 5 minutes sonication and then addition of 0.5 ml Triton X100 to give a fine dispersion (time=0).

Preparation of Suspension 2a 0.0548 gr of iodine was added to 100 ml of acetone, and were mixed until full dissolution, followed by addition of 0.021 gr PVDF and a mixing for 30 minutes. Then adding 2 ml of the "light slurry" suspension and mixing for 15 minutes, followed by 5 minutes sonication and then addition of 0.5 ml Triton X100 to give a fine dispersion (time=0).

Preparation of Suspension 2

0.1 gr of SHMP added to 100 ml of acetone and mixed, followed by the addition of 0.0548 gr of iodine to 100 ml of acetone, and were mixed until full iodine dissolution. Then 0.021 gr PVDF were added and mixed for 30 minutes. Then adding 2 ml of the "light slurry" suspension and mixing for 15 minutes, followed by 5 minutes sonication and then addition of 0.5 ml Triton X100 to give a fine dispersion (time=0).

Preparation of Suspension 3

0.3 gr of SHMP added to 100 ml of acetone and mixed, followed by addition of 0.0548 gr of Iodine was added to 100 ml of acetone, and were mixed until full Iodine dissolution. followed by addition of 0.021 gr PVDF and a mixing for 30 minutes. Then adding 2 ml of the "light slurry" suspension and mixing for 15 minutes, followed by 5 minutes sonication and then addition of 0.5 ml Triton X100 to give a fine dispersion (time=0).

Preparation of Suspension 4

0.5 gr of SHMP added to 100 ml of acetone and mixed, followed by addition of 0.0548 gr of Iodine was added to 100 ml of acetone, and were mixed until full Iodine dissolution. followed by addition of 0.021 gr PVDF and a mixing for 30 minutes. Then adding 2 ml of the "light slurry" suspension and mixing for 15 minutes, followed by 5 minutes sonication and then addition of 0.5 ml Triton X100 to give a fine dispersion (time=0).

The difference between suspension 2a, suspension 2, suspension 3, and suspension 4 is only the concentration of the SHMP.

The difference between suspension 1, and suspensions 2a, 2, 3, & 4 is that 1 conductive additive, active material and binder were inserted from powder, while all other suspensions active material and conductive additive were inserted using "light slurry". The "light slurry" was prepared as follows:

Adding 0.5 gr of SHMP to 15 ml of NMP, followed by 2 minutes mixing, and then adding 0.8 ml of 5% PVDF in NMP and mixing for 15 minutes. Than adding 36.8 gr of NMC 532 and mixing for 1 hour. After 1-hour, slow addition, while mixing of 1.2 gr SC 65 in 24 ml NMP and addition of 3 ml NMP—than mixed overnight.

Stability measurements of EPD bath suspensions for cathode deposition comprising NMC as active material, SC65 as conductive additive and PVDF (Solef 5310) as binder were carried out. Four different suspensions were tested: suspension (1) involved commonly used ingredients in a bath. Suspensions (2), (3) and (4) included active materials, where the amount of PVDF in the light slurry equaled 0.2% out of the 4.2% needed, and where the additional PVDF was added separately as a powder.

The "light slurry enables a homogeneous deposition, where each particle in the slurry contains full composition of the desired deposition. While suspension (1) contains separate particles of different size and properties, from micro size of the active material to nano size of the conductive additive, Suspensions (2), (3) and (4), initially contained larger particles. Such particles without a stabilizer flocculated and sedimented faster than expected.

The only difference was observed where SHMP (e.g., 0.1 gr, ~0.1% w/w from the total bath suspension) was added. When SHMP was added to the suspensions, the suspensions were found highly stable over 100 hours and more after initiation of the experiment.

Comparative Data: SHMP Versus KH550

Three suspensions were prepared in 40 ml acetone each:
First suspension: Pristine—0.5 gr silicon nanoparticles (40-50 nm) with no deflocculant;
Second suspension: 0.5 gr Silicon nanoparticles (40-50 nm) with 0.2% w/w of SHMP as a deflocculant;
Third suspension: 0.5 gr silicon nanoparticles (40-50 nm) with 0.2% w/w KH550.

KH550 is 3-aminopropyltriethoxysilane, a versatile amino-functional coupling agent used to provide association between inorganic surfaces and organic polymers. The silicon-containing portion of the molecule provides strong bonding to substrates. The primary amine function reacts with the polymeric material.

While the first and third suspensions demonstrated fairly immediate particle flocculation, in the presence of SHMP, no such flocculation was observed. After 48 hours of experiment the differences became only more significant. After 96 hours all precipitated in one way or another. But the SHMP sample (second) did not show full precipitation and was stable again after re-mixing for 1 minute, while the $1^{st}$ and the $3^{rd}$ precipitate quickly (in less than 2 hours) after re-mixing.

Comparative Data: SHMP Versus $Li_2CO_3$

Two suspensions were prepared in 40 ml distilled water each:
First suspension: 0.4 gr Silicon nanoparticles (40-50 nm) with 0.2% w/w of SHMP;
Second suspension: 0.4 gr silicon nanoparticles (40-50 nm) with 0.2% w/w $Li_2CO_3$.

One can divide the known deflocculants into 4 major groups:
 a. Carbonates (such as sodium carbonate ($Na_2CO_3$), lithium carbonate ($Li_2CO_3$) and other metal carbonates);
 b. Silicates (such as sodium silicate);
 c. Alkaline light sulfonates; and
 d. Polyphosphates.

In this comparison, the stability of a suspension with two different deflocculant types, the polyphosphates (herein represented by SHMP) and carbonates (herein represented by $Li_2CO_3$ was tested.

While both showed, at the beginning good suspension stability, after several hours precipitation and floating (buoyant effect) was observed in the $2^{nd}$ suspension, while no such behavior was observed in the $1^{st}$ suspension even after 28 hours from the beginning of the experiment.

The invention claimed is:
1. An electrophoretic deposition (EPD) bath comprising a stabilized slurry, said slurry comprising at least one active material in a particulate solid form, at least one conducting additive in a particulate solid form, at least one liquid carrier, at least one deflocculant and optionally at least one binder, wherein the at least one deflocculant is selected to increase a zeta potential of the slurry and repulsive forces between the solid particles of the conducting additive, said at least one deflocculant being selected from sodium hexametaphosphate (SHMP ($NaPO_3)_n$), SHMP derivatives (R-SHMP), trisodium phosphate, tetrasodium pyrophosphate, sodium tripolyphosphate, sodium tetraphosphate, and sodium polyphosphates.

2. The bath according to claim 1, wherein the slurry is free of agglomerated particulate materials.

3. The bath according to claim 1, wherein the at least one deflocculant is sodium hexametaphosphate.

4. The bath according to claim 1, for use in manufacturing a functional electrode or a separation area.

5. The bath according to claim 4, wherein the electrode is an anode.

6. The bath according to claim 1, wherein the at least one active material is an anode active material selected from graphite, silicon-based materials, carbon-silicon composite materials, metal-based materials, metal composite materials, carbon-metal composite materials and combination thereof.

7. The bath according to claim 6, wherein the silicon-based material is selected from silicon nanoparticles (SiNP), silicon nanowires (SiNW) and silicon nano flakes (SiNF).

8. The bath according to claim 6, wherein the metal-based material is selected from lithium titanium oxide (LTO), germanium nanoparticles (GeNP), germanium nanowires (GeNW), tin nanoparticles (SnNP), tin nanowires (SnNW), tin/tin sulfide, lead nanoparticles (PbNP), lead nanowires (PbNW), lithium metal alloy of formula $Li_xSi_n$, aluminum, core/shell aluminum particles, lithium and combination thereof.

9. The bath according to claim 6, wherein the carbon-metal composite material is selected from tin/tin sulfide on reduced graphene oxide (Sn/SnS@rGO), tin@rGO, lead@rGO, tin@graphite, tin@hard-carbon, tin@carbon, lead@graphite, lead@hard-carbon, lead@carbon and combination thereof.

10. The bath according to claim 4, wherein the electrode is a cathode.

11. The bath according to claim 1, wherein the at least one active material is a cathode active material selected from lithium nickel manganese cobalt oxide (NMC), lithium iron phosphate (LFP), lithium cobalt oxide (LCO), lithium ferrophosphate (LFP), lithium manganese iron phosphate (LMFP), lithium nickel cobalt aluminum oxide (NCA), lithium manganese oxide (LMO), lithium nickel manganese oxide (LNMO), nickel-rich cathode (lithium nickel oxide, LNO) and combination thereof.

12. The bath according to claim 1, wherein the at least one conductive additive in the form of particles is selected from carbon based materials or carbon composite materials.

13. The bath according to claim 1, wherein the at least one binder is present and selected from carboxymethyl cellulose (CMC) and derivatives thereof, styrene-butadiene rubber (SBR), polyvinyliedene fluoride (PVDF), lithium alginate, sodium Alginate, sodium polyacrylic acid (PAA), lithium PAA, ionic conducting polymers, hydrophobic or super-hydrophobic ion conductive polymers, optionally in cross-linked forms, and combination thereof.

14. A method of electrophoretic deposition, the method comprising obtaining a bath according to claim 1.

15. The method according to claim 14, wherein the slurry is prepared by adding at least one deflocculating agent to a carrier liquid, optionally prior to adding solid particulate materials.

* * * * *